Feb. 6, 1962 E. R. BOWERMAN, JR 3,020,410

SHIFT REGISTER

Filed Oct. 28, 1960 3 Sheets-Sheet 1

INVENTOR
EDWIN R. BOWERMAN JR.
BY
R. J. Frank
ATTORNEY

Feb. 6, 1962 E. R. BOWERMAN, JR 3,020,410

SHIFT REGISTER

Filed Oct. 28, 1960 3 Sheets-Sheet 2

INVENTOR
EDWIN R. BOWERMAN JR.
BY R. J. Frank
ATTORNEY

Feb. 6, 1962 E. R. BOWERMAN, JR 3,020,410

SHIFT REGISTER

Filed Oct. 28, 1960 3 Sheets-Sheet 3

INVENTOR
EDWIN R. BOWERMAN JR.
BY R. J. Frank
ATTORNEY

United States Patent Office 3,020,410
Patented Feb. 6, 1962

3,020,410
SHIFT REGISTER

Edwin R. Bowerman, Jr., Whitestone, N.Y., assignor to General Telephone and Electronics Laboratories, Inc., a corporation of Delaware Filed Oct. 28, 1960, Ser. No. 65,825
14 Claims. (Cl. 250—208)

This invention relates to shift registers and in particular to shift registers employing electroluminescent and photoconductive components.

A shift register may be defined as a device wherein an ordered set of information elements is stored and thereafter shifted by one or more element positions with respect to the original position of the stored set. These devices are widely used in electronic digital computers wherein the set can represent a number in binary notation, the number being shifted one or more binary digits to the left or right of the original position as required. Shift registers are used to perform various arithmetic computer operations such as multiplication or division.

It is an object of this invention to provide an improved shift register employing light emitting and light responsive components.

Another object is to provide a shift register utilizing electroluminescent and photoconductive elements in which a positive visual binary readout is obtained from each storage unit.

Still another object is to provide a shift register of the type utilizing electroluminescent and photoconductive elements which operates at high speed and is relatively insensitive to voltage variations, changes in the intensity of the light emitted by the electroluminescent cells and variations in the sensitivity of the photoconductive elements.

Yet another object is to provide a shift register employing electroluminescent and photoconductive elements which is practically independent of photoconductive decay rates.

A further object is to provide a shift register having no moving parts and which may be easily fabricated at low cost.

The present invention consists of a shift register comprising an array of storage units optically coupled in series. Each of the storage units in the array includes first and second light responsive devices electrically connected in series. A first light emitting device is electrically connected in parallel with the second light responsive device while a second light emitting device is electrically connected in parallel with the first light responsive device. The first light emitting device and the first light responsive device are optically coupled while the second light emitting device and the second light responsive device are also optically coupled. A third light responsive device is electrically connected in series with the first and second light responsive devices.

The first and second light responsive devices in each of the stage units (with the exception of the first unit) are optically coupled to the first and second light emitting devices respectively located in the preceding storage unit of the array. The third light responsive device in each storage unit (again with the exception of the first unit) is optically coupled to both the first and second light emitting devices in the preceding storage unit. In the first storage unit, the first, second and third light responsive devices are coupled to first and second light emitting input devices in the same way that the light responsive devices in each of the other storage units are optically coupled to the light emitting devices in the preceding storage unit.

In a preferred embodiment of the invention, each of the light responsive devices consists of a photoconductive element having a high impedance in the absence of light and a relatively low impedance when it is illuminated. Each of the light emitting devices consists of an electroluminescent cell which produces light whenever a voltage of suitable magnitude and frequency is applied across its terminals.

When no light falls upon any of the photoconductors in a storage unit their impedances are high and the electroluminescent cells in that unit remain dark despite the application of an excitation voltage across the unit. This condition, in which both electroluminescent cells are dark, indicates that no information is stored in the unit. If light is allowed to fall upon the first and third photoconductive elements, their impedances are reduced and application of an excitation voltage to the storage unit causes the first electroluminescent cell to light. The lighting of the first electroluminescent cell is arbitrarily defined as indicating that a binary "0" is stored in the unit. Similarly, if the second and third photoconductive elements are illuminated and an excitation voltage is applied to the storage unit, the second electroluminescent cell will light. The lighting of the second electroluminescent cell indicates that a "1" is stored in that particular storage unit.

Information in the form of binary digits is supplied by the input electroluminescent cells to the first storage unit in the array. Equidistantly spaced clock pulses, each consisting of several cycles of an alternating excitation voltage are supplied to all of the storage units. The clock pulses may also be obtained from a D.-C. voltage source if electroluminescent cells responsive to D.-C. voltage are provided. A first train of periodic clock pulses is applied to the first, third, fifth (i.e. the odd numbered) storage units in the array while a second train of periodic pulses is applied to the even numbered storage units. The pulses in the first and second trains alternate in time, a pulse of one train being applied during the interval that no pulse is supplied by the other train.

As will be explained in more detail hereinafter, information is transferred into a given storage unit from the preceding unit only when a pulse is applied to the given unit. However, such transfer is dependent upon the state of the third photoconductor in the given unit. If the third photoconductor is illuminated, information is transferred from the preceding unit upon application of a clock pulse to the given unit; if the third photoconductor is not illuminated, no transfer takes place. Whether a "0" or "1" is transferred is determined by whether the first or third photoconductor in the given unit is illuminated. A storage unit is reset either by the removal of the clock pulse from the unit or by the removal of illumination from the third photoconductor thereby increasing its impedance sufficiently to deenergize the electroluminescent cell.

In a modified version of the invention, the third photoconductor in the first stage is omitted. However, when this circuit is used, the input signal must be applied before or simultaneously with the clock pulse to the first stage in order to avoid erroneous operation of the shift register. Also, fabrication of the device may be somewhat simplified by employing two electrically paralleled photoconductors whenever one is used in the original circuit and exciting each by the light of a single corresponding electroluminescent cell.

Illustrative embodiments of my invention will now be described in detail with reference to the accompanying drawings wherein.

Figure 1:
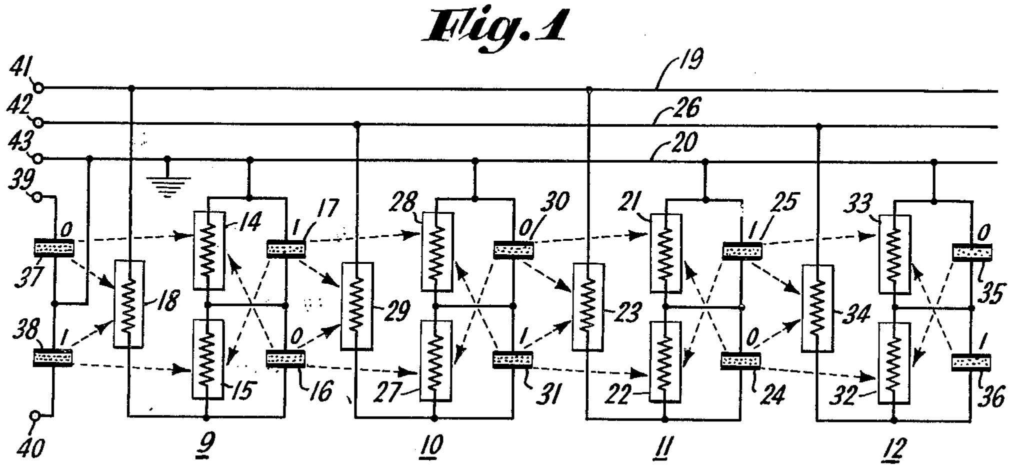
FIG. 1 is a schematic diagram of a shift register constructed in accordance with the principle of my invention.

Referring to FIG. 1, there is shown a shift register having four storage units 9, 10, 11 and 12. While only four units have been shown, it will be understood that as many storage units may be added to the array as is required for a particular application.

Storage unit 9 comprises a first photoconductor 14 connected in series with a second photoconductor 15. A first electroluminescent cell 16 is connected in parallel with photoconductor 15 while a second electroluminescent cell 17 is connected in parallel with photoconductor 14. The junction of photoconductor 15 and the electroluminescent cell 16 is connected to one end of a third photoconductor 18, the other end of photoconductor 18 being connected to a first bus 19 adapted to receive a clock pulse $E_1$. The junction of photoconductor 14 and electroluminescent cell 17 is connected to a common ground bus 20. Similarly, storage unit 11 is composed of first, second and third photoconductive elements 21, 22 and 23 and first and second electroluminescent cells 24 and 25, storage unit 11 being connected in the same manner as storage unit 9. Storage unit 11 like storage unit 9 is also connected between buses 19 and 20.

Storage units 10 and 12 are identical to storage units 9 and 11. However, they are connected between a second bus 26 (adapted to receive a second clock pulse $E_2$) and ground bus 20. Storage unit 10 is composed of first, second, and third photoconductors 27, 28, 29 and first and second electroluminescent cells 30 and 31, while storage unit 12 consists of first, second, and third photoconductors 32, 33, 34 and first and second electroluminescent cells 35 and 36.

In each of the storage units, the first electroluminescent cell is optically coupled to the first photoconductor while the second electroluminescent cell is optically coupled to the second photoconductor. Also the first electroluminescent cell in each storage unit is optically coupled to the first and third photoconductors in the following storage unit and the second electroluminescent cell is optically coupled to the second and third photoconductors in the following unit. Thus, electroluminescent cell 16 in storage unit 9 is optically coupled to photoconductors 14, 27, and 29 while electroluminescent cell 17 is optically coupled to photoconductors 15, 28, and 29 as indicated by the arrows in FIG. 1. Similarly, electroluminescent cell 30 is optically coupled to photoconductors 21, 23, and 27, electroluminescent cell 31 to photoconductors 22, 23, and 28, electroluminescent cell 24 to photoconductors 32, 34, and 21, and electroluminescent cell 25 to photoconductors 33, 34, and 22. Electroluminescent cells 35 and 36, in storage unit 12, are optically coupled to photoconductors 32 and 33 respectively. If a fifth storage unit were added to the array, cells 35 and 36 would also be optically coupled to the photoconductors in the added unit.

First and second electroluminescent input cells 37 and 38 each have one end electrically connected to input terminals 39 and 40 respectively and their other ends grounded. Electroluminescent cell 37 is optically coupled to photoconductors 14 and 18 while electroluminescent cell 38 is optically coupled to photoconductors 15 and 18.

A first train of clock pulses $E_1$ is applied between terminal 41 of bus 19 and grounded terminal 43, and a second train of clock pulses $E_2$ is applied between terminal 42 of bus 26 and terminal 43. Clock pulses $E_1$ and $E_2$ are preferably of equal duration and are applied sequentially to the shift register, the height of the pulses shown in FIG. 2 being proportional to the R.M.S. values of the alternating voltages $E_1$ and $E_2$.

In the mode of operation to be described, binary information is supplied to the shift register digit by digit in synchronism with the $E_1$ clock pulses. The information in each of the odd numbered storage units 9, 11 in the array is shifted to the next corresponding even numbered storage units 10, 12 respectively each time an $E_2$ pulse is applied to the even numbered units and the $E_1$ voltage is reduced to zero. Similarly, the information in each of the even numbered storage units is shifted to the next corresponding odd numbered storage unit each time an $E_1$ pulse is applied to the odd numbered units and the $E_2$ pulse is zero. Each of the electroluminescent cells in FIG. 1 is designated by the numerals "0" or "1" to indicate the binary digit stored in the storage unit when that cell is on. If neither cell is lit, this indicates that no information is stored in the unit.

The operation of the shift register is as follows. With clock pulses $E_1$ and $E_2$ applied periodically between terminals 41, 42 respectively and ground and no signal applied to input terminals 39 and 40, photoconductors 18, 29, 23 and 34 are dark and therefore their respective impedances are high. Thus, most of the clock pulse voltage appears across these photoconductors, the voltage across electroluminescent cells 16, 17, 30, 31, 24, 25, 35 and 36 being too low to cause them to emit significant light.

Figure 2:
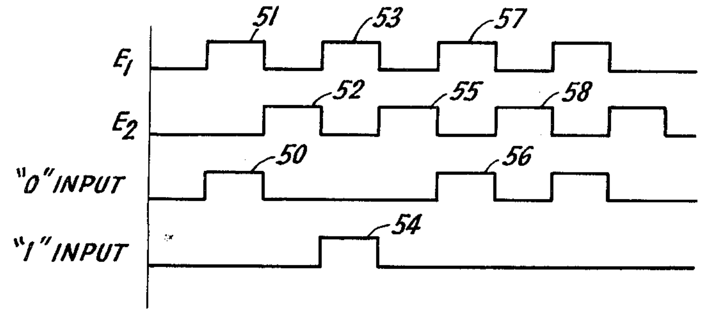
FIG. 2 depicts the relative timing of the voltages applied to the circuit of FIG. 1.
Figure 6:
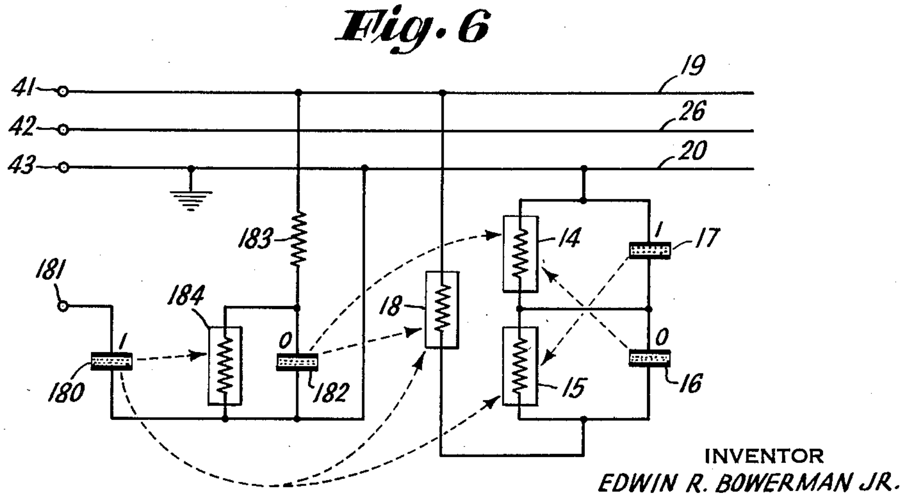
FIG. 6 is a schematic diagram showing an embodiment of the invention requiring only a single input wire.

The application of an input pulse 50 (FIG. 2) to terminal 39 energizes electroluminescent cell 37 thereby introducing a binary "0" into the input circuit. The light from cell 37 illuminates photoconductors 14 and 18 of storage unit 9 causing their impedances to decrease sharply. As shown in FIG. 2, input pulse 50 is applied to the register simultaneously with the application of a clock pulse 51 to terminal 41 and, therefore, most of the voltage applied to terminal 41 appears across electroluminescent cell 16 causing it to light. The lighting of electroluminescent cell 16 indicates that a "0" is stored in storage unit 9. Light from cell 16 impinges upon photoconductor 14 maintaining a relatively low impedance path around electroluminescent cell 17.

Electroluminescent cell 16 also illuminates photoconductors 27 and 29 in storage unit 10 thereby reducing their impedances. As a result, when clock pulse 52 is applied to terminal 42, essentially all of the voltage $E_2$ is impressed across electroluminescent cell 30 causing it to light. At the same time that pulse 52 is applied to terminal 42, the voltage applied to terminal 41 falls to zero thereby extinguishing electroluminescent cell 16. Since it is no longer illuminated, the impedance of photoconductor 29 begins to increase while the impedance of photoconductor 27 remains low due to its illumination by cell 30. The time and magnitudes of the clock pulse voltages and the impedances of the photoconductors are selected so that an energized electroluminescent cell will remain on during the pulse and the electroluminescent cell in series with it will remain short-circuited.

During the application of the next clock pulse 53 to terminal 41, an input pulse 54 is applied to terminal 40 of the shift register. Electroluminescent cell 38 is illuminated indicating that a "1" is to be introduced into the register. The light from electroluminescent cell 38 illuminates photoconductors 15 and 18, thereby short-circuiting electroluminescent cell 16 and causing electroluminescent cell 17 to be energized. Simultaneously, the "0" stored in storage unit 10 is transferred to storage unit 11 since the impedance of photoconductors 21 and 23 is reduced allowing most of the clock pulse voltage 53 to be applied across electroluminescent cell 24. Thus, during the interval encompassing the application of clock pulses 51 and 53 to the circuit, the "0" which was initially coupled into the register has been transferred through storage units 9 and 10 to storage unit 11 and a "1" has been stored in storage unit 9.

The application of clock pulse 55 to terminal 42 causes the "1" stored in unit 9 to be transferred to storage unit 10, as indicated by the lighting of electroluminescent cell 31. Cell 31 is energized through the low impedance of photoconductors 28 and 29, these photoconductors having been previously illuminated by electroluminescent cell 17. Similarly, the "0" stored in storage unit 11 is transferred to storage unit 12 since the impedances of photoconductors 32 and 34 have been reduced by light from electroluminescent cell 24 allowing essentially all of the voltage to appear across electroluminescent cell 35.

In the same way, the application of "0" input pulse 56 to terminal 39 simultaneously with the application of clock pulse 57 to terminal 39 causes a "0" to be stored in unit 9 and causes the "1" stored in unit 10 to be transferred to storage unit 11. The application of clock pulse 58 to terminal 42 results in the "0" stored in unit 9 being transferred to unit 10 and the "1" stored in unit 11 being transferred to unit 12.

This sequence is repetitive, each bit of information being transferred from one storage unit in the array to the next each time a clock pulse is applied to the circuit.

In FIG. 2 the "0" and "1" input pulses have been shown equal in duration to the $E_1$ clock pulse and occurring simultaneously therewith. However, by selecting photoconductors 18, 29, 23 and 34 so that the rate at which their resistance increases is relatively low compared to the frequency of the clock pulses, the input pulses may be shorter than the clock pulses and may be applied at any time during the cycle.

Figure 3:
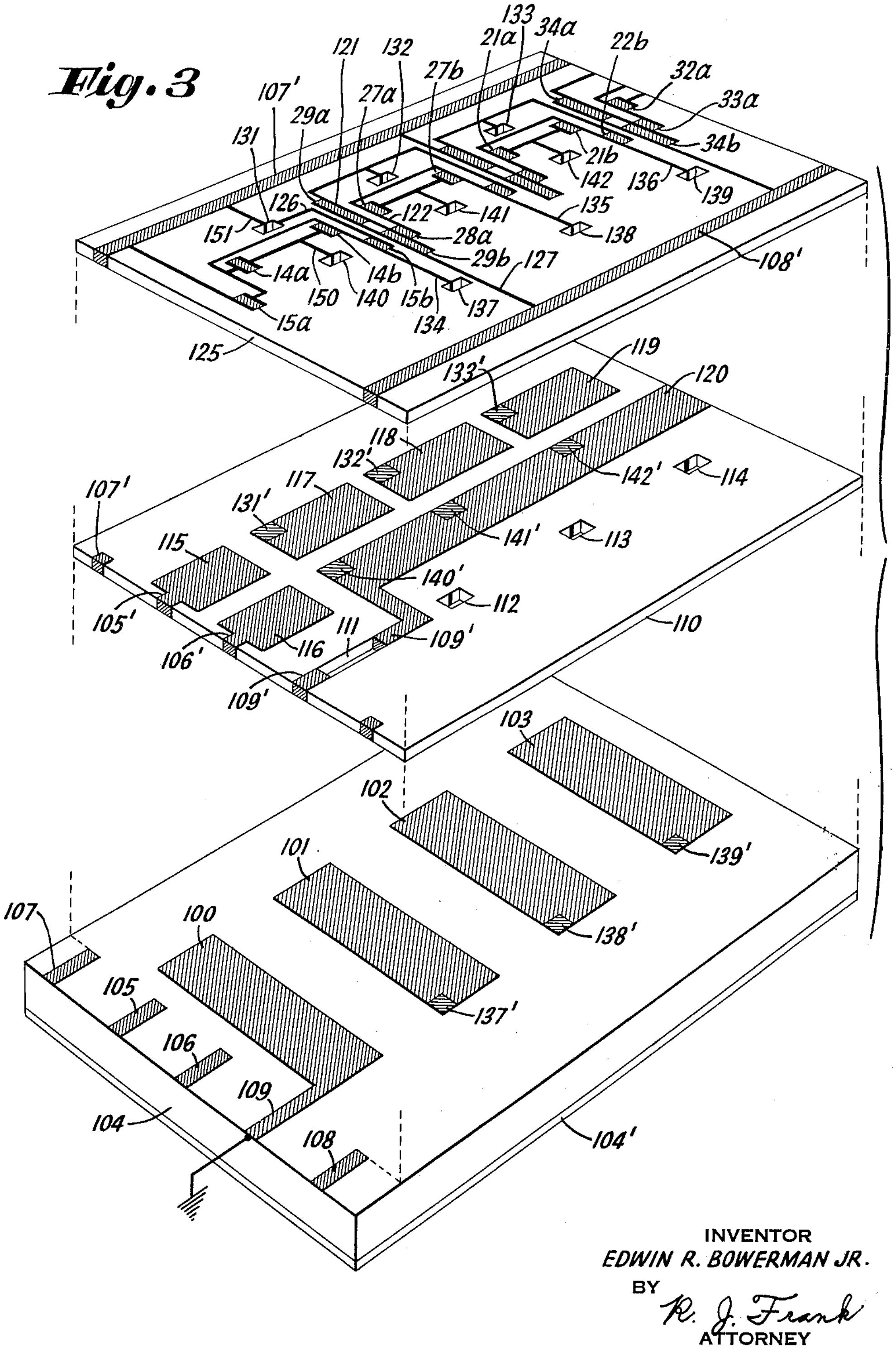
FIG. 3 is an exploded view of a modified shift register.
Figure 4:
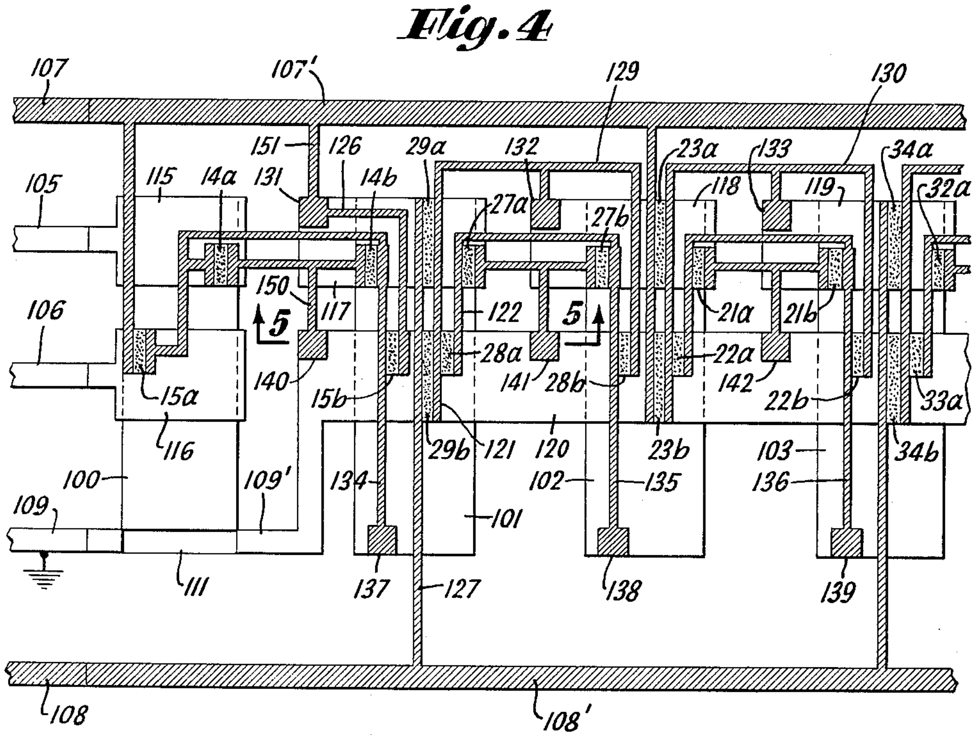
FIG. 4 is a top view of the shift register of FIG. 3.
Figure 5:
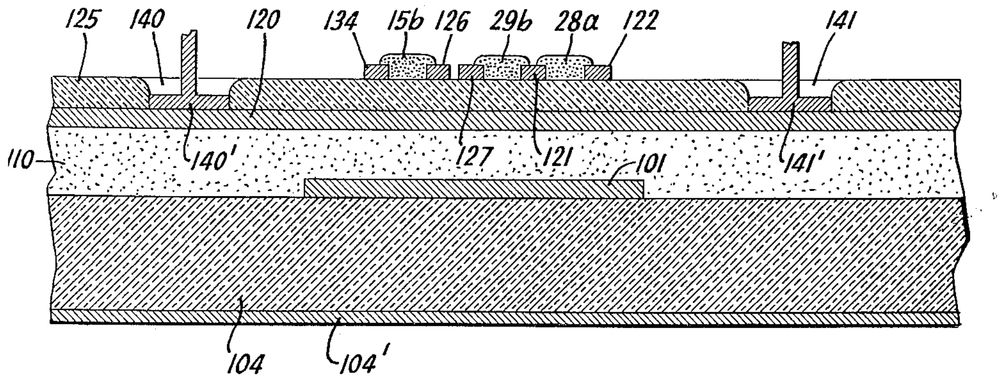
FIG. 5 is a cross-sectional view of the shift register of FIG. 3.

Referring to FIG. 3, there is shown an exploded perspective view of the first three stages of a modified shift register constructed in accordance with the principles of my invention. The device of FIG. 3 differs from that shown schematically in FIG. 1 only in the omission of photoconductor 18 from storage unit 9 and the use of two photoconductors electrically connected in parallel whenever one is shown in FIG. 1. The paralleled photoconductors depicted in FIG. 3 and in the detailed views of FIGS. 4 and 5 are designated by numerals corresponding to those used in FIG. 1. However, in FIGS. 3–5 the numerals are followed by the letter *a* or *b* to indicate that two photoconductors are used instead of one. With this configuration each photoconductor is illuminated by a single electroluminescent cell rather than by two cells as in FIG. 1.

As illustrated in FIG. 3, four electrodes 100, 101, 102, and 103 are applied to a sandblasted glass base 104 having a coating of black paint 104', on the side opposite the electrodes. Two input conductors 105 and 106 and two clock pulse buses 107 and 108 are affixed to the surface at the left end of glass base 104 as is a ground bus 109 which makes direct contact with electrode 100. Electrodes 100–103 and conductors 105–109 may be formed of gold or may consist of transparent conductors.

An electroluminescent layer 110 is applied over electrodes 100–103, the edge of layer 110 being adjacent the ends of conductors 105–108. Apertures 111, 112, 113, and 114 are formed in electroluminescent layer 110 directly over electrodes 100–103 respectively. Transparent electrodes 115 and 116 are located on the top surface of electroluminescent layer 110 directly over electrode 100 and are electrically connected to conductors 105 and 106 by conductors 105' and 106', conductors 105' and 106' extending over the edge of layer 110. Transparent electrodes 117, 118, and 119 are similarly affixed to the top surface of electroluminescent layer 110 directly over electrodes 101, 102, and 103 respectively. A transparent electrode 120, which is positioned over electrodes 101–103, is also attached to the top surface of electroluminescent layer 110 and is connected to ground bus 109 by extending conductor 109' over the edge of aperture 111 to grounded electrode 100.

A sheet of clear glass 125 is placed over transparent electrodes 115–120 and strips of photoconductive material applied thereto. As shown in the plan view of FIG. 4, electrical connections are made to the photoconductors by gold conductors such as 126 which couple photoconductor 15b to clock pulse bus 107 via bus 107', conductor 127 connecting photoconductors 29a and 29b to clock pulse bus 108 via bus 108', and conductors 121 and 122 which contact photoconductor 28a. Transparent electrodes 117, 118 and 119 are connected to conductors 126, 129 and 130 through apertures 131, 132 and 133 respectively in glass 125 while electrodes 101, 102 and 103 are connected to conductors 134, 135, and 136 through apertures 112, 113 and 114 in electroluminescent layer 110 and through apertures 137, 138, and 139 in glass plate 125. Ground connections are made from electrode 120 through apertures 140, 141 and 142 to the *a* and *b* sections of photoconductors 14, 27 and 21 respectively. The areas where the conductors extending through apertures 131–133, 137–139, and 140–142 touch the corresponding electrodes are designated by 131'–133', 137'–139', and 140'–142' respectively.

Details of the construction of the shift register are shown further in the cross-sectional view of FIG. 5 which is taken along the lines 5—5 of FIG. 4.

The operation of the shift register of FIGS. 3–5 is identical with that of the circuit of FIG. 1 except that the input pulse cannot be initiated later than the associated clock pulses. This is because photoconductor 18 of FIG. 1 has been omitted and it is therefore necessary to positively reduce the impedance of either photoconductor 14 or 15 by light from an electroluminescent cell to avoid random triggering of the electroluminescent cells in the first stage.

When an input "0" pulse is applied to conductor 105 of FIG. 3 simultaneously with the application of a clock pulse $E_1$ to bus 107, the input pulse is applied between electrodes 115 and 100 causing the portion of electroluminescent layer 110 between the electrodes to emit light. The light from this portion of layer 100 illuminates photoconductor 14a causing its impedance to decrease sharply. Photoconductor 14a has one end connected by conductor 134, aperture 137 and aperture 112 to area 137' on electrode 101 while the other end of photoconductor 14a is connected via lead 150 and aperture 140 to grounded electrode 120. Thus photoconductor 14a effectively short-circuits the portion of electroluminescent layer 110 located between electrodes 101 and 120. The portion of layer 110 located between electrodes 101 and 117 is energized by the clock pulse voltage applied to bus 107'. Electrode 117 is connected directly to bus 107' by conductor 151 extending through aperture 131 while electrode 101 is connected to ground via bus 109, aperture 111, electrode 120, aperture 140, conductor 150, photoconductor 14b, conductor 134, aperture 137, and aperture 112. Light from this portion of electroluminescent layer 110 (signifying that a "0" is stored in the storage unit of the register) illuminates photoconductor 14b thereby holding its impedance at a low value. Light also falls on photoconductors 27a and 29a causing their impedances to drop sharply, photoconductor 28a thereby short-circuiting the portion of the electroluminescent layer 110 located between electrodes 102 and 120 in a manner similar to that previously described in connection with photoconductor 14a. As a result, when a clock pulse voltage $E_2$ is applied to bus 108, most of the voltage appears across the portion of the electroluminescent layer between electrodes 102 and 118. Electrode 102 is connected to ground via conductor 135 passing through apertures 113 and 138 to illuminated photoconductor 27a and then through photoconductor 27a, and aperture 141 to grounded electrode 120. Electrode 118 is connected to bus 108' through aperture 132, illuminated photoconductor 29a and lead 127. The rest of the circuit may be traced in a similar manner, the operation being analogous to that already described for the schematic diagram of FIG. 1.

The shift registers shown in FIG. 1 and FIGS. 3–5 require a separate "0" input lead and a separate "1" input lead. This is advantageous in many applications because a positive indication is provided of the absence of any input signal. However, it may be desirable in some circumstances to have only one input lead to the shift register. This is provided in the circuit of FIG. 5 wherein input electroluminescent cell 180 introduces a "1" in the register whenever terminal 181 is energized. In the absence of a signal on terminal 181, a "0" is introduced into the register each time a clock pulse is applied to bus 19.

The operation of this circuit is as follows. Whenever a clock pulse is applied to terminal 41 of bus 19, electroluminescent cell 182 is energized through resistor 183. Light from cell 182 falls on photoconductors 18 and 14 reducing their impedances and thereby shorting electroluminescent cell 17. This permits most of the clock pulse voltage to appear across electroluminescent cell 16 in a manner similar to that previously described in connection with FIG. 1. The illumination of cell 16 signifies that a "0" has been stored in the register.

If instead of no voltage being applied to terminal 181 during the clock pulse on bus 19 a voltage is applied to electroluminescent cell 180, light falls upon photoconductor 184 paralleling electroluminescent cell 182 and also upon photoconductors 18 and 15. As a result, the impedance of photoconductor 184 is lowered causing electroluminescent cell 182 to be short-circuited and extinguished. Similarly, electroluminescent cell 16 is shorted by photoconductor 15 and the clock pulse voltage is applied, through the relatively low impedances of photoconductors 18 and 25, across electroluminescent cell 17. The lighting of electroluminescent cell 17 indicates storage of a "1" in this unit of the register.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A shift register comprising an array of storage units optically coupled in series, each of said storage units including first and second series-connected photoconductive elements; first and second series-connected electroluminescent cells, said first photoconductive element being optically coupled to said first electroluminescent cell and said second photoconductive element being optically coupled to said second electroluminescent cell; means electrically coupling said first photoconductive element in parallel with said second electroluminescent cell; means electrically coupling said second photoconductive element in parallel with said first electroluminescent cell; and a third photoconductive element connected in series with said first and second photoconductive elements, the first and second electroluminescent cells in each of said storage units being optically coupled to the first and second photoconductive elements respectively in the succeeding storage unit in said series, said first and second electroluminescent cells being further optically coupled to the third photoconductive element in said succeeding storage unit.

2. In a shift register, a storage unit comprising first and second series-connected photoconductive elements; first and second series-connected electroluminescent cells, said first photoconductive element being optically coupled to said first electroluminescent cell and said second photoconductive element being optically coupled to said second electroluminescent cell; means coupling said first photoconductive element in parallel with said second electroluminescent cell; means coupling said second photoconductive element in parallel with said first electroluminescent cell; and a third photoconductive element connected in series with said first and second photoconductive elements.

3. A shift register comprising an array of storage units optically coupled in series, each of said units including first and second series-connected photoconductive elements; first and second series-connected electroluminescent cells, said first photoconductive element being optically coupled to said first electroluminescent cell and said second photoconductive element being optically coupled to said second electroluminescent cell; means coupling said first photoconductive element in parallel with said second electroluminescent cell; means coupling said second photoconductive element in parallel with said first electroluminescent cell; a third photoconductive element connected in series with said first and second photoconductive elements; and first and second light emitting input means optically coupled to the first and second photoconductive elements respectively in the first storage unit of said array of storage units, said first and second light emitting input means being further optically coupled to the third photoconductive element in said first storage unit.

4. A shift register comprising an array of storage units optically coupled in series, each of said storage units including first and second series-connected photoconductive elements; first and second series-connected electroluminescent cells, said first photoconductive element being optically coupled to said first electroluminescent cell and said second photoconductive element being optically coupled to said second electroluminescent cell; means coupling said first photoconductive element in parallel with said second electroluminescent cell; means coupling said second photoconductive element in parallel with said first electroluminescent cell; a third photoconductive element connected in series with said first and second photoconductive elements; and first and second light emitting input means optically coupled to the first and second photoconductive elements respectively in the first storage unit of said array of storage units, said first and second light emitting input means being further optically coupled to the third photoconductive element in said first storage unit, the first and second electroluminescent cells in each of said storage units being optically coupled to the first and second photoconductive elements respectively in the succeeding storage unit in said series, said first and second electroluminescent cells being further optically coupled to the third photoconductive element in said succeeding storage unit.

5. A shift register as defined in claim 4 wherein said first and second light emitting input means comprise electroluminescent cells.

6. A shift register comprising first and second sets of storage units, each of said storage units including first and second series-connected photoconductive elements; first and second series-connected electroluminescent cells, said first photoconductive element being optically coupled to said first electroluminescent cell and said second photoconductive element being optically coupled to said second electroluminescent cell; means connecting the junction ends of said first and second photoconductive elements to the junction ends of said first and second electroluminescent cells; means connecting the other ends of said first electroluminescent cell and said second photoconductive element to a reference voltage source; a third photoconductive element connected to the other ends of said first photoconductive element and said second electroluminescent cell; means for applying a first clock voltage to the third photoconductive elements in said first set of storage units; and means for applying a second clock voltage to the third photoconductive elements in said second set of storage units, said first and second clock pulses being applied respectively to said shift register, the first and second electroluminescent cells in each of said first set of storage units being optically coupled to the first and second photoconductive elements respectively in a succeeding one of said second set of storage units, said first and second electroluminescent cells being further optically coupled to the third photoconductive element in said succeeding one of said second set of storage units.

7. In a shift register, a storage unit comprising first and second series-connected light responsive elements;

first and second series-connected light emitting elements, said first light responsive element being optically coupled to said first light emitting element and said second light responsive element being optically coupled to said second light emitting element; means coupling said first light responsive element in parallel with said second light emitting element; means coupling said second light responsive element in parallel with said first light emitting element; and a third light responsive element connected in series with said first and second light responsive elements.

8. A shift register comprising an array of storage units optically coupled in series, each of said storage units including first and second series-connected light responsive elements; first and second series-connected light emitting elements, said first light responsive element being optically coupled to said first light emitting element and said second light responsive element being optically coupled to said second light emitting element; means electrically coupling said first light responsive element in parallel with said second light emitting element; means electrically coupling said second light responsive element in parallel with said first light emitting cell; and a third light responsive element connected in series with said first and second light responsive elements, the first and second light emitting elements in each of said storage units being optically coupled to the first and second light responsive elements respectively in the succeeding storage unit in said series, said first and second light emitting elements being further optically coupled to the third light responsive element in said succeeding storage unit.

9. In a shift register, a storage unit comprising first and second series-connected light responsive means, each of said first and second light responsive means consisting of a pair of photoconductive elements electrically connected in parallel; first and second series-connected light emitting means, one of the photoconductive elements of said first light responsive means being optically coupled to said first light emitting means and one of the photo-conductive elements of said second light responsive means being optically coupled to said second light emitting means; means coupling said first light responsive means in parallel with said second light emitting means; and means coupling said second light responsive means in parallel with said first light emitting means.

10. In a shift register, a storage unit comprising first and second series-connected light responsive means, each of said first and second light responsive means consisting of a pair of photoconductive elements electrically connected in parallel; first and second series-connected light emitting means, one of the photoconductive elements of said first light responsive means being optically coupled to said first light emitting means and one of the photoconductive elements of said second light responsive means being optically coupled to said second light emitting means; means coupling said first light responsive means in parallel with said second light emitting means; means coupling said second light responsive means in parallel with said first light emitting means; and third light responsive means connected in series with said first and second light responsive means, said third light responsive means consisting of a pair of photoconductive elements electrically connected in parallel.

11. A shift register comprising an array of storage units optically coupled in series, each of said storage units including first and second series-connected light responsive means, said first and second light responsive means each consisting of first and second photoconductive elements; first and second series-connected light emitting means, the first photoconductive element of said first light responsive means being optically coupled to said first light emitting means and the first photoconductive element of said second light responsive means being optically coupled to said second light emitting means; means electrically coupled to said second light emitting means; means electrically coupling said first light responsive means in parallel with said second light emitting means; means electrically coupling said second light responsive means in parallel with said first light emitting means; and third light responsive means electrically connected to said first and second light responsive means, said third light responsive means consisting of first and second photoconductive elements, the first light emitting means in each of said storage units being optically coupled to both the second photoconductive element of the first light responsive means and to the first photoconductive element of the third light responsive means in the succeeding stage, and the second light emitting means in each of said storage units being optically coupled to both the second photoconductive element of the second light responsive means and to the second photoconductive element of the third light responsive means in the succeeding stage.

12. A shift register comprising a non-conductive base; an electroluminescent layer; a first set of electrodes located between one side of said electroluminescent layer and said non-conductive base; a second set of electrodes affixed to the other side of said electroluminescent layer, each of the electrodes of said second set being opposite a corresponding electrode of said first set, the portions of said electroluminescent layer subtended between opposite electrodes of said first and second sets emitting light when said opposite electrodes are energized by an applied voltage; a transparent insulating layer, a plurality of groups of light responsive elements affixed to said transparent insulating layer, each of said groups consisting of first, second, and third photoconductors illuminated by a common portion of said electroluminescent layer; and conductive bar means, said conductive bar means coupling the first photoconductor in each group in parallel with the third photoconductor in an adjacent group and between an electrode of said first set and a corresponding electrode of said second set, said conductive bar means further coupling the second photoconductor in each group between an applied voltage source and a corresponding electrode of said second set.

13. The shift register defined in claim 12 wherein said second set of electrodes is transparent.

14. In a shift register having a storage unit including first, second and third series-connected photoconductors, said first photoconductor being optically coupled to a first electroluminescent cell and electrically connected in parallel with a second electroluminescent cell, said second photoconductor being optically coupled to a second electroluminescent cell and electrically connected in parallel with said first electroluminescent cell, said third photoconductor being electrically connected to a voltage source; an input circuit comprising a third electroluminescent cell and a resistor electrically connected in series, said third electroluminescent cell and said resistor being connected between said first photoconductor and said voltage source; said third electroluminescent cell being optically coupled to said first and third photoconductors; a fourth photoconductor electrically connected in parallel with said third electroluminescent cell; and a fourth electroluminescent cell adapted to receive an input signal, said fourth electroluminescent cell being optically coupled to said second, third, and fourth photoconductors, said fourth electroluminescent cell being energized when it is desired to change the numeral stored in said storage unit from "0" to "1."

References Cited in the file of this patent

UNITED STATES PATENTS

| | | |
|---|---|---|
| 2,895,054 | Loebner | July 14, 1959 |
| 2,907,001 | Loebner | Sept. 29, 1959 |
| 2,947,874 | Tomlinson | Aug. 2, 1960 |
| 2,997,596 | Vize | Aug. 22, 1961 |